United States Patent
Yuasa

(10) Patent No.: US 8,679,239 B2
(45) Date of Patent: Mar. 25, 2014

(54) ADSORBENT MATERIAL AND XENON ADSORPTION DEVICE USING SAME

(75) Inventor: Akiko Yuasa, Kyoto (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 13/394,742

(22) PCT Filed: Aug. 26, 2010

(86) PCT No.: PCT/JP2010/005255
§ 371 (c)(1),
(2), (4) Date: Mar. 7, 2012

(87) PCT Pub. No.: WO2011/030513
PCT Pub. Date: Mar. 17, 2011

(65) Prior Publication Data
US 2012/0167770 A1    Jul. 5, 2012

(30) Foreign Application Priority Data

Sep. 9, 2009 (JP) ................................. 2009-207719
Oct. 22, 2009 (JP) ................................. 2009-243014

(51) Int. Cl.
*B01D 53/02* (2006.01)

(52) U.S. Cl.
USPC .......... 96/108; 95/96; 95/102; 95/127; 95/148

(58) Field of Classification Search
USPC ....................................... 95/127, 148; 96/108
See application file for complete search history.

(56) References Cited

U.S. PATENT DOCUMENTS 3,501,923 A * 3/1970 Lehmer ............................ 62/600
3,971,640 A * 7/1976 Golovko .......................... 95/114
4,414,005 A * 11/1983 De Bievre et al. ............. 95/127
4,447,353 A   5/1984 Pence et al.
4,454,062 A * 6/1984 Penzhorn et al. ............. 588/14

(Continued)

FOREIGN PATENT DOCUMENTS

DE    196 41 643    4/1998
DE    298 17 824    12/1998

(Continued)

OTHER PUBLICATIONS

Tomiku, et al., "Development of Refining Technology of Xe Recovered from Reprocessing Plant Off Gas for Commercial Use", Japan Nuclear Cycle Development Institute-Technical Reports, No. 15, Jun. 2002, pp. 113-129.
Zhang, "A study on novel synthesis method of ZSM-5 and manufacture and surface features of Er light-emitting compound material" Chinese Master Theses Full-text Database, Engineering Science and Technology I, Oct. 31, 2008.

*Primary Examiner* — Christopher P Jones
(74) *Attorney, Agent, or Firm* — Hamre, Schumann, Mueller & Larson, P.C.

(57) ABSTRACT

An adsorbent comprising a zeolite having a pore diameter of not less than 4.5 angstroms and not more than 7.3 angstroms as a principal component, which can adsorb xenon under ordinary temperatures and pressures or under ordinary temperatures and low xenon partial pressures. In addition, a xenon adsorbing device comprising an adsorbent, a container of a vapor poorly-permeating material, which houses the adsorbent, and a joint part which joins the container to a xenon enclosure space, in which the adsorbent is communicated with the xenon enclosure space. Thereby, the present invention provides an adsorbent which recovers xenon directly from the used equipment in which xenon is enclosed with efficiency under ordinary temperatures and pressures or under ordinary temperatures and low xenon partial pressures, and a xenon adsorbing device using the adsorbent.

2 Claims, 2 Drawing Sheets

(56) References Cited

U.S. PATENT DOCUMENTS

| | | | | |
|---|---|---|---|---|
| 4,874,592 | A | * | 10/1989 | Shino et al. .................. 423/262 |
| 5,032,152 | A | | 7/1991 | Vansant et al. |
| 5,039,500 | A | * | 8/1991 | Shino et al. .................. 423/262 |
| 6,955,711 | B2 | * | 10/2005 | Kawai et al. ...................... 95/96 |
| 7,285,154 | B2 | * | 10/2007 | Karwacki et al. ................. 95/96 |
| 2003/0000385 | A1 | | 1/2003 | Kawai et al. |
| 2003/0106335 | A1 | | 6/2003 | Golden et al. |
| 2005/0235831 | A1 | * | 10/2005 | Taveira et al. .................. 96/111 |
| 2009/0107331 | A1 | | 4/2009 | Urakami |
| 2009/0266232 | A1 | | 10/2009 | Nakamura et al. |
| 2010/0074820 | A1 | | 3/2010 | Kimoto et al. |
| 2010/0115994 | A1 | | 5/2010 | Hayashida et al. |
| 2012/0167765 | A1 | | 7/2012 | Yuasa |

FOREIGN PATENT DOCUMENTS

| | | |
|---|---|---|
| JP | 56-500976 | 7/1981 |
| JP | 2-006814 | 1/1990 |
| JP | 4-145921 | 5/1992 |
| JP | 2003-221212 | 8/2003 |
| JP | 2003-342010 | 12/2003 |
| JP | 2004-161503 | 6/2004 |
| JP | 2005-246137 | 9/2005 |
| JP | 2008-137847 | 6/2008 |
| WO | 2007/029807 | 3/2007 |
| WO | 2008/108354 | 9/2008 |
| WO | 2008/111488 | 9/2008 |
| WO | 2010/021127 | 2/2010 |

* cited by examiner

ADSORBENT MATERIAL AND XENON ADSORPTION DEVICE USING SAME

TECHNICAL FIELD

The present invention relates to an adsorbent which recovers xenon directly from the used equipment in which xenon is enclosed with efficiency under ordinary temperatures and pressures or under ordinary temperatures and low xenon partial pressures, and a xenon adsorbing device using the adsorbent.

BACKGROUND ART

In recent years, xenon is often used as flash light sources at a macro inspection in producing semiconductors or light-emitting gases of a plasma display. On the other hand, only an extremely trace amount of xenon is contained in the air. Accordingly, in a method of separating and producing xenon from air, it is necessary to take in a large amount of air and refine xenon by undergoing complicated separating/refining processes. Accordingly, xenon of high purity is very expensive, and it is very important to establish a system to recover, refine and reuse used xenon.

For example, moisture and carbon dioxide are removed from xenon in a detector of an X-ray inspection apparatus with a zeolite adsorbing layer. Thereafter, other impurities gases are removed with a getter layer. A method of refining and recovering xenon in this manner is proposed (e.g., see PTL 1).

Also, first, moisture is adsorbed and removed from liquid oxygen containing xenon and krypton by silica gel or the like. Thereafter, a Li- or Ag-exchanged X zeolite is used for an adsorbent to selectively adsorb xenon at low temperature. A method of recovering xenon by desorbing xenon from the zeolite is proposed (e.g., see PTL 2).

Further, as a method of removing impurities contained in effluent gases of various steps using rare gases such as xenon efficiently, there is proposed a method of efficiently separating and removing a trace of impurities such as hydrogen, water vapor and nitrogen oxide from a mixed gas predominantly composed of a rare gas and a nitrogen gas (see PTL 3 and PTL 4).

Moreover, as a method of functionally excluding moisture, carbon dioxide and the like from effluent gases emitted in a semiconductor production process to recover a high purity of xenon gas, there is proposed a method in which impurities are removed by zeolite or a separation membrane module, and then xenon is adsorbed on a zeolite having a pore diameter of 5 angstroms or more under pressures to be recovered (see PTL 5).

Moreover, in order to make an effective use of emitted xenon containing a trace of radioactive krypton, a refining technology, using a PSA (Pressure Swing Absorption) purge method, of recovered xenon is proposed (see Non-PTL 1). In the refining technology of recovered xenon, xenon is adsorbed from the mixed gas of xenon and krypton under pressures by use of a Na—X zeolite or a Ca—X zeolite as the adsorbent to selectively adsorb xenon.

Currently, equipment in which xenon is enclosed (e.g. plasma display, semiconductor production apparatus) is disposed of, and then is disassembled/separated/recovered at a disposal field for recycle or buried in a landfill. However, xenon is released to the atmosphere during disassembly and is little recovered.

Xenon released to the atmosphere is controlled so as to be below an air standard concentration. However, atmospheric release of xenon is not preferred since disassembling workers may inhale a trace of xenon. Therefore, it is desirable that in a step of disassembling equipment or steps up to burying equipment in a landfill, xenon can be adsorbed from the inside of the equipment under ordinary temperatures and pressures or under ordinary temperatures and low xenon partial pressures without special environments or introduction of facilities. Moreover, a technology capable of recovering the adsorbed xenon is necessary.

However, in the constitutions described in PTLs 1 to 5 and Non-PTL 1, xenon is recovered by removing impurities from xenon gases including impurities, which are emitted from a plant or the like, or by a method in which an adsorbent adsorbs xenon under pressures or at low temperature. Therefore, it is difficult to recover xenon directly from the used equipment in which xenon is enclosed with efficiency under ordinary temperatures and pressures or under ordinary temperatures and low xenon partial pressures.

CITATION LISTS

Patent Literatures

PTL 1: Unexamined Japanese Patent Publication No. 4-145921
PTL 2: Unexamined Japanese Patent Publication No. 2003-221212
PTL 3: Unexamined Japanese Patent Publication No. 2003-342010
PTL 4: Unexamined Japanese Patent Publication No. 2004-161503
PTL 5: Unexamined Japanese Patent Publication No. 2008-137847

Non-Patent Literature

Non-PTL 1: Yasushi TOMIKU et al., "Japan Nuclear Cycle Development Institute-Technical Reports", No. 15, June (2002), 113-129

SUMMARY OF THE INVENTION

An adsorbent of the present invention is an adsorbent comprising a zeolite having a pore diameter of not less than 4.5 angstroms and not more than 7.3 angstroms as a principal component, which can adsorb xenon under ordinary temperatures and pressures or under ordinary temperatures and low xenon partial pressures. Further, the present invention pertains to a xenon adsorbing device comprising an adsorbent, a container of a vapor poorly-permeating material, which houses the adsorbent, and a joint part which joins the container to a xenon enclosure space to communicate the adsorbent with the xenon enclosure space. Therefore, it is possible to recover xenon from the used equipment, in which xenon is enclosed, with efficiency under ordinary temperatures and pressures or under ordinary temperatures and low xenon partial pressures.

DESCRIPTION OF EMBODIMENTS

First Exemplary Embodiment

Figure 1:
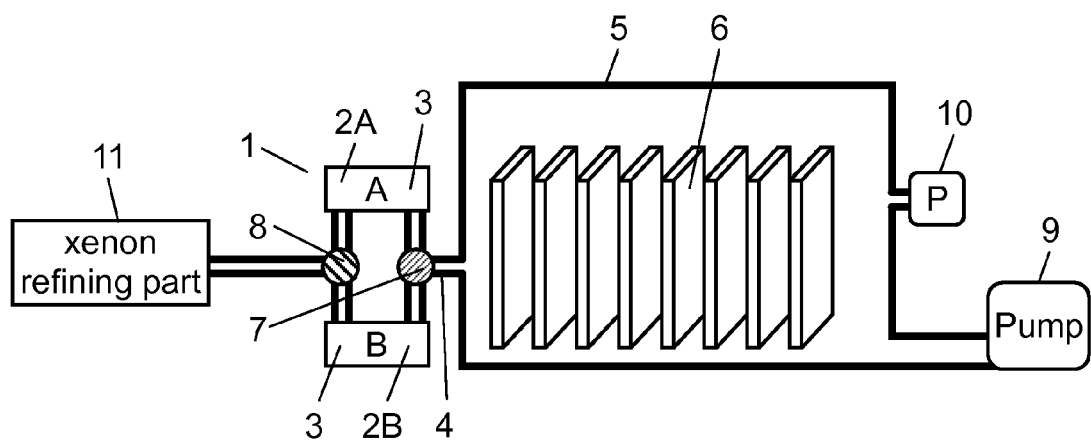
FIG. 1 is a schematic view of a xenon adsorbing device used for a xenon recovery method according to a first exemplary embodiment of the present invention.

FIG. 1 is a schematic view of xenon adsorbing device 1 used for a xenon recovery method according to a first exemplary embodiment of the present invention.

Xenon adsorbing device 1 in the present exemplary embodiment has adsorbent 3, cartridges 2a and 2b which house adsorbent 3, and joint part 4 communicating cartridges 2a and 2b with xenon enclosure space 5 which is a space containing xenon enclosed. Cartridges 2a and 2b filled with adsorbent 3 are communicated with xenon enclosure space 5 with joint part 4 interposed between the cartridges and the xenon enclosure space. Adsorbent 3 is an adsorbent which comprises a zeolite having a pore diameter of not less than 4.5 angstroms and not more than 7.3 angstroms (not less than 0.45 nm and not more than 0.73 nm) as a principal component and can adsorb xenon under ordinary temperatures and pressures or under ordinary temperatures and low xenon partial pressures. Adsorbent 3 can adsorb xenon under ordinary temperatures and pressures or under ordinary temperatures and low xenon partial pressures because a van der Waals' radius of xenon is 4.32 angstroms for an object of adsorbing xenon. In order to develop an adsorption capacity by an interaction with a xenon molecule, a pore diameter needs to be 4.5 angstroms or more. However, when the pore diameter is too large, since an interactive force between a pore wall and the xenon molecule decreases, it is thought that the pore diameter is desirably 7.3 angstroms or less. In addition, an ordinary temperature referred to herein is about $-10°$ C. to $40°$ C. An ordinary pressure is about 1 atmosphere (range of about $+-5\%$), a low xenon partial pressure is in a range of not less than 0.001 Pa and less than 100000 Pa.

Zeolite which is a principal component of adsorbent 3 includes one of an AFI, a BETA, a MOR and a MFI zeolites defined by a size of a pore diameter of zeolite. Zeolite more desirably includes a copper ion-exchanged MFI zeolite. The copper ion-exchanged MFI zeolite is included in a MFI zeolite, and this zeolite has a higher xenon adsorbing force than that of other zeolites. Adsorbent 3 may be a mixture thereof, or may contain other adsorbents capable of adsorbing xenon. Types of the above-mentioned zeolites are determined by International Zeolite Association. Pore diameters of the above-mentioned zeolites are different, but basic constituent elements are the same. In addition, the pore diameter is thought to be an average between molecules composing zeolite.

In addition, zeolite is basically a powder. However, the powder may be pelletized or molded.

Adsorbent 3 is housed in cartridges 2A and 2B which are a container of a vapor poorly-permeating material. Since cartridges 2A and 2B are made of a vapor poorly-permeating material, they can suppress degradation of adsorbent 3 until adsorbent 3 adsorbs xenon. Joint part 4 joins cartridges 2A and 2B to xenon enclosure space 5 to communicate cartridges 2A and 2B with xenon enclosure space 5. Xenon enclosure space 5 is composed of a xenon recovery chamber which houses xenon enclosure equipment 6 of, for example, a used TV set or the like.

Cartridges 2A and 2B filled with adsorbent 3 have the same constitution. However, two cartridges are provided so that while one performs an operation of adsorption, the other can perform an operation of detachment. These cartridges are joined to xenon enclosure space 5 in which xenon-containing equipment 6, in which used xenon is enclosed, is disposed with opening-closing part 7 and joint part 4 interposed between the cartridge and xenon enclosure space.

Opening-closing part 7 can connect xenon enclosure space 5 to cartridge 2A or cartridge 2B, or can avoid connecting xenon enclosure space 5 to any of cartridge 2A or cartridge 2B. Further, cartridges 2A and 2B are connected to a xenon refining part with discharge part 8 interposed therebetween. Xenon refining part 11 refines adsorbed xenon.

Xenon enclosure space 5 can house a plurality of xenon enclosure equipment 6 in which used xenon is enclosed. Further, pressure gauge 10 to monitor a pressure in a chamber and vacuum pump 9 are connected to xenon enclosure space 5. Thereby, the air in xenon enclosure space 5 is sucked out/removed until a pressure is lowered to a predetermined value before adsorbing xenon. Thus, contamination of air as impurities during xenon adsorption of adsorbent 3 is suppressed.

Next, a xenon recovery method in accordance with the present exemplary embodiment will be described. First, xenon-containing equipment 6 is placed in xenon enclosure space 5 which is a xenon recovery chamber to house xenon-containing equipment 6. Next, xenon enclosure space 5 is hermetically sealed. Then, a pressure in xenon enclosure space 5 is reduced by use of vacuum pump 9. Conditions of a pressure reducing are not particularly specified, but a lower pressure is desirable in order to prevent the contamination of air. During the pressure reducing, opening-closing part 7 is in a closed state.

Next, it is confirmed by pressure gauge 10 that a pressure in xenon enclosure space 5 is reduced to a predetermined value, and an operation for recovering xenon from xenon-containing equipment 6 is performed. A means of this operation is not particularly limited. For example, a valve, which automatically releases enclosed xenon when a pressure in xenon enclosure space 5 is reduced to a predetermined value, is disposed in xenon-containing equipment 6. Alternatively, a mechanism, which breaks a part of xenon-containing equipment 6 to release xenon, may be disposed in xenon enclosure space 5.

Then, opening-closing part 7 is opened so that cartridge 2A is communicated with xenon enclosure space 5. At this time, adsorbent 3 in cartridge 2A is in a state active to xenon adsorption after completing detaching process of xenon. By opening opening-closing part 7, adsorbent 3 adsorbs xenon. This behavior can be monitored by an indicate of pressure gauge 10. When adsorbent 3 adsorbs xenon, an indicate of pressure gauge 10 decreases. If a pressure indicate of pressure gauge 10 becomes constant, it is considered that adsorption reaches equilibrium and the adsorption is completed, and opening-closing part 7 is closed.

During xenon is adsorbed in cartridge 2a, an operation of detaching the adsorbed xenon is performed at adsorbent 3 in cartridge 2B. A method of desorbing xenon is not particularly limited, and xenon can be desorbed by heating or sucking out by a vacuum pump. For example, a heater (not shown) is disposed at a periphery of cartridge 2B. After the completion of xenon adsorption, opening-closing part 7 is closed and discharge part 8 is opened. At this time, if the heater is energized, adsorbed xenon is desorbed from adsorbent 3 and discharged to xenon refining part 11 through discharge part 8. A method of refining xenon is not particularly limited. In xenon recovered from equipment using a high purity of xenon, an amount of impurity gas other than air components which can be contaminated in recovering is relatively small.

Therefore, a high purity of xenon can be easily obtained by an existing separation and refining method of impurities.

In the present exemplary embodiment, cartridges 2A and 2B alternately adsorbs and detaches xenon repeatedly, and thereby xenon can be efficiently recovered. However, only one cartridge may be disposed to perform adsorption and detachment.

Second Exemplary Embodiment

Figure 2:
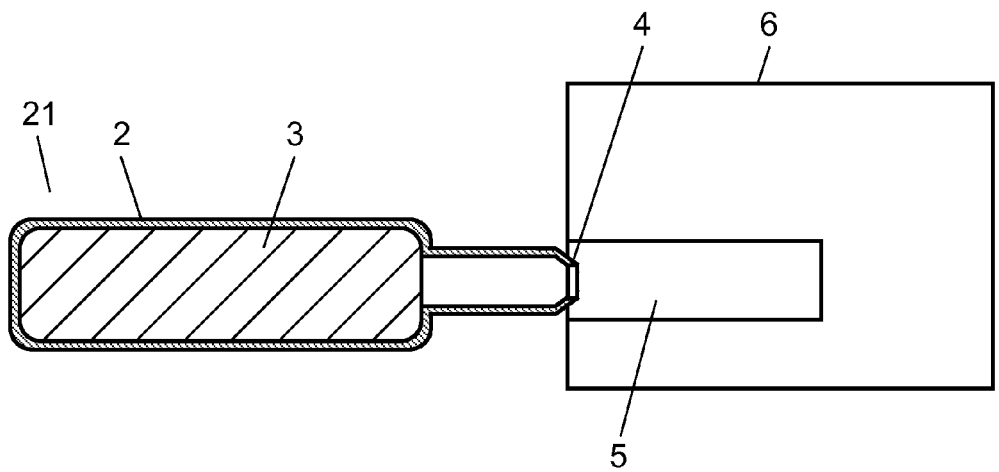
FIG. 2 is a sectional view of a xenon adsorbing device used for a xenon recovery method according to a second exemplary embodiment of the present invention.

FIG. 2 is a sectional view of a xenon adsorbing device used for a xenon recovery method according to a second exemplary embodiment of the present invention. In addition, a device having configurations similar to those shown in the first exemplary embodiment will be described by denoting by the same reference marks, and detailed descriptions may be omitted. In xenon adsorbing device 21 in the present exemplary embodiment, adsorbent 3 is housed in container 2. Further, joint part 4 which joins container 2 to xenon enclosure space 5 is provided in xenon adsorbing device 21. Workers can communicate container 2 with xenon enclosure space 5 by using joint part 4 provided at a tip of container 2. By providing joint part 4 in this manner, xenon enclosure space 5 can be joined to a housing space of adsorbent 3. In addition, in order to prevent intrusion of outside air from joint part 4, it is desirable to join xenon-containing equipment 6 to xenon adsorbing device 21 by melt-bonding, welding or the like using a vapor poorly-permeating material etc. Further, adsorbent 3 is enclosed in the vapor poorly-permeating material until adsorbent 3 adsorbs xenon. Therefore, degradation of adsorbent 3 can be suppressed until adsorbent 3 adsorbs xenon.

Next, a xenon recovery method by xenon adsorbing device 21 will be described.

First, container 2 is communicated with xenon enclosure space 5 by using joint part 4. When adsorbent 3 is brought into contact with xenon in xenon enclosure space 5, it becomes possible to adsorb xenon on adsorbent 3. Then, by desorbing xenon from adsorbent 3, xenon is recovered. A method of desorbing xenon is not particularly limited, and examples thereof include heating or suction by a vacuum pump. When xenon is recovered by such a xenon recovery method, excellent adsorption characteristics of adsorbent 3 are recovered.

In addition, a state of xenon adsorbing device 21 before being communicated with xenon enclosure space 5 is not particularly limited, and a rubber plug may be put in a tip of joint part 4 and may be removed in communicating joint part 4 with xenon enclosure space 5.

Figure 3:
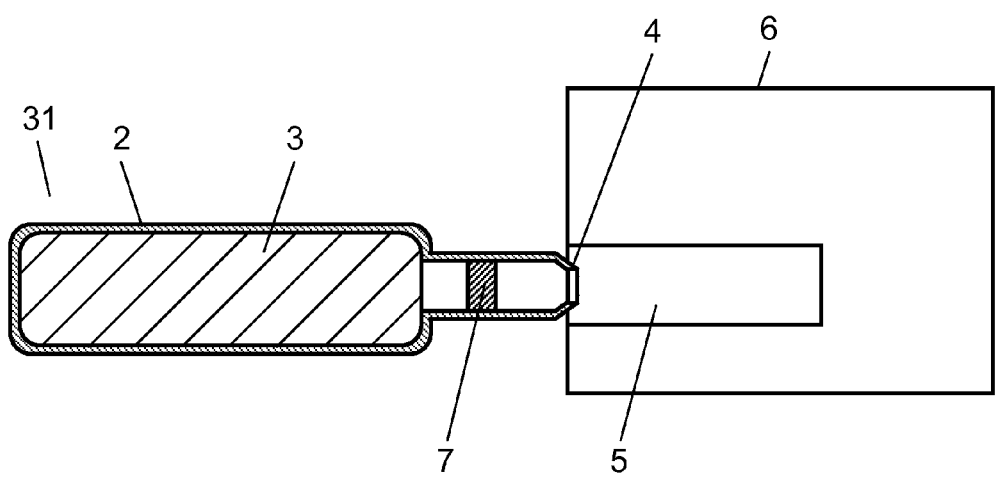
FIG. 3 is a sectional view of another xenon adsorbing device used for a xenon recovery method according to the second exemplary embodiment of the present invention.

Next, in reference to FIG. 3, a more preferable xenon adsorbing device according to the present exemplary embodiment will be described. FIG. 3 is a sectional view of another xenon adsorbing device used for a xenon recovery method according to the second exemplary embodiment of the present invention. In addition, a device having configurations similar to those shown in the first exemplary embodiment and FIG. 2 will be described by denoting by the same reference marks.

In xenon adsorbing device 31 in the present exemplary embodiment, opening-closing part 7 is provided in addition to xenon adsorbing device 21 in FIG. 2. Opening-closing part 7 is sealed to prevent adsorbent 3 in container 2 from contacting with the outside air. Container 2 is made of Pyrex (trademark) glass predominantly composed of silicate. A material of opening-closing part 7 is a low melting point glass. In addition, a melting point of the low melting point glass is lower than a melting point of the glass of container 2.

Next, a xenon recovery method by xenon adsorbing device 31 will be described.

First, container 2 is communicated with xenon enclosure space 5 by using joint part 4. Next, a region where opening-closing part 7 is disposed is heated from above the surface of container 2. At this time, a low melting point glass composing opening-closing part 7 is heated so that the temperature is lower than the melting point of the glass of container 2 and higher than the melting point of opening-closing part 7. When heating in this manner, the low melting point glass is melted and deformed so as not to block a communication passage and a seal of opening-closing part 7 becomes unsealed. As a result of this, container 2 is communicated with xenon enclosure space 5. When adsorbent 3 is brought into contact with xenon in xenon enclosure space 5, it becomes possible to adsorb xenon on adsorbent 3. When a transparent glass is used for a material of container 2, it is possible to visually confirm from outside that xenon enclosure space 5 is communicated with container 2 housing adsorbent 3. Therefore, xenon can be recovered more surely. Then, by desorbing xenon from adsorbent 3, xenon is recovered. A method of desorbing xenon is not particularly limited, and examples thereof include a method of taking out adsorbent 3 from container 2 or a method of heating whole container 2 or a method of sucking out xenon with a vacuum pump. When xenon is recovered by such a xenon recovery method, adsorbent 3 exerts excellent adsorption characteristics to adsorb and store xenon with efficiency. Further, adsorbent 3 does not absorb other gases until adsorbent 3 recovers xenon directly from xenon enclosure space 5. Accordingly, it becomes possible to prevent adsorbent 3 from being saturated by adsorbing other gases to be deactivated.

In the present exemplary embodiment, the low melting point glass is used as a material of opening-closing part 7 and the Pyrex (trademark) glass is used as a material of container 2 of a vapor poorly-permeating material, but a combination of an aluminum soldering material for opening-closing part 7 and an aluminum container for container 2 can be also employed. Further, a mechanism, in which adsorbent 3 enclosed in a capsule placed in container 2 is opened by an external stimulus such as heat to automatically communicate with xenon enclosure space 5, can be used.

In the present exemplary embodiment, xenon adsorbing devices 21 and 31 are joined to xenon enclosure space 5 when recovering xenon after recovering used xenon-containing equipment 6. However, xenon adsorbing devices 21 and 31 may be joined to xenon enclosure space 5 in advance. Further, in order to prevent intrusion of outside air from joint part 4, it is desirable to join xenon-containing equipment 6 to xenon adsorbing devices 21, 31 by melt-bonding, welding or the like using a vapor poorly-permeating material etc.

In addition, in the above description, it is described that container 2 is composed of a vapor poorly-permeating material. The vapor poorly-permeating material is a material having a gas permeability of 1143 [fm/sPa] or less. The gas permeability is more desirably 114 [fm/sPa] or less. Not only Pyrex, but also glass, metal, and a laminated film with laminated metal foil can be used as the vapor poorly-permeating material. Among these, when glass predominantly composed of silicate is used for a material of container 2, a gas permeability is low and in addition it is possible to visually confirm from outside that xenon enclosure space 5 is communicated with adsorbent 3. Therefore, xenon can be recovered surely.

Hereinafter, in the present exemplary embodiment, the results of evaluation of xenon adsorption of various types of zeolites to be used as adsorbent 3 are shown in Examples 1 to 5. With respect to adsorption characteristics, an amount of adsorbed xenon under atmospheric pressure, an amount of adsorbed xenon from equipment with a spatial volume of 50 cc (50 ml), in which xenon is enclosed at a xenon partial pressure of 30000 Pa, and an amount of adsorbed xenon at a pressure of 10 Pa, particularly, for evaluation of xenon adsorption under low pressures are evaluated. An amount of xenon remaining after adsorbent 3 adequately adsorbs xenon is evaluated as a residual xenon partial pressures (corresponding to a pressure at the time when an amount of xenon which the adsorbent can adsorb reaches a limit amount). Further, in Comparative Examples 1 to 3, zeolites having a pore diameter of less than 4.5 angstroms and zeolites having a pore diameter of more than 7.3 angstroms, which are different from those in Examples 1 to 5, are used and evaluated. In addition, a volume of container 2 is about 50 cc. About 0.5 g of zeolite to be used as adsorbent 3 is enclosed in container 2 and evaluated. The results of evaluations are shown in Tables 1 and 2 below.

Example 1

In Example 1, an AFI zeolite commercialized product with a pore diameter of 7.3 angstroms is used in xenon adsorbing device 31 in the second exemplary embodiment as adsorbent 3 and evaluated. Consequently, an amount of adsorbed xenon is 30 cc/g under atmospheric pressures, 10 cc/g at a xenon partial pressure of 30000 Pa, and almost 0 cc/g at a pressure of 10 Pa. A residual xenon partial pressure is 40 Pa.

Example 2

In Example 2, a BETA zeolite commercialized product with a pore diameter of 7.1 angstroms is used in xenon adsorbing device 31 as adsorbent 3 and evaluated. Consequently, an amount of adsorbed xenon is 40 cc/g under atmospheric pressures, 18 cc/g at a xenon partial pressure of 30000 Pa, and almost 0 cc/g at a pressure of 10 Pa. A residual xenon partial pressure is 20 Pa.

Example 3

In Example 3, a MOR zeolite commercialized product with a pore diameter of 6.8 angstroms is used in xenon adsorbing device 31 as adsorbent 3 and evaluated. Consequently, an amount of adsorbed xenon is 50 cc/g under atmospheric pressures, 40 cc/g at a xenon partial pressure of 30000 Pa, and almost 0 cc/g at a pressure of 10 Pa. A residual xenon partial pressure is 10 Pa.

Example 4

In Example 4, a MFI zeolite commercialized product with a pore diameter of 5.5 angstroms is used in xenon adsorbing device 31 as adsorbent 3 and evaluated. Consequently, an amount of adsorbed xenon is 55 cc/g under atmospheric pressures, 35 cc/g at a xenon partial pressure of 30000 Pa, and 0.1 cc/g at a pressure of 10 Pa. A residual xenon partial pressure is 3 Pa.

Comparative Example 1

In Comparative Example 1, a Na—X zeolite commercialized product with a pore diameter of 7.4 angstroms is used in xenon adsorbing device 31 as adsorbent 3 and evaluated. Consequently, an amount of adsorbed xenon is 18 cc/g under atmospheric pressures, 9 cc/g at a xenon partial pressure of 30000 Pa, and 0 cc/g at a pressure of 10 Pa. A residual xenon partial pressure is 800 Pa.

Comparative Example 2

In Comparative Example 2, an A zeolite commercialized product with a pore diameter of 4.1 angstroms is used in xenon adsorbing device 31 as adsorbent 3 and evaluated. Consequently, an amount of adsorbed xenon is 3 cc/g under atmospheric pressures, almost 1 cc/g at a xenon partial pressure of 30000 Pa, and 0 cc/g at a pressure of 10 Pa. A residual xenon partial pressure is 28000 Pa.

Comparative Example 3

In Comparative Example 3, a Y zeolite commercialized product with a pore diameter of 7.4 angstroms is used in xenon adsorbing device 31 as adsorbent 3 and evaluated. Consequently, an amount of adsorbed xenon is 30 cc/g under atmospheric pressures, almost 10 cc/g at a xenon partial pressure of 30000 Pa, and 0 cc/g at a pressure of 10 Pa. A residual xenon partial pressure is 1000 Pa.

The results of evaluations are shown in Table 1.

TABLE 1

|  | Pore diameter of zeolite (angstrom) | Amount of adsorbed xenon under atmospheric pressure (cc/g) | Amount of adsorbed xenon at a xenon partial pressure of 30000 Pa (cc/g) | Amount of adsorbed xenon at a pressure of 10 Pa (cc/g) | Residual xenon partial pressure (Pa) |
|---|---|---|---|---|---|
| Example 1 | 7.3 | 30 | 10 | Almost 0 | 40 |
| Example 2 | 7.1 | 40 | 18 | Almost 0 | 20 |
| Example 3 | 6.8 | 50 | 40 | Almost 0 | 10 |
| Example 4 | 5.5 | 55 | 35 | 0.1 | 3 |
| Comparative Example 1 | 7.4 | 18 | 9 | 0 | 800 |
| Comparative Example 2 | 4.1 | 3 | Almost 1 | 0 | 28000 |
| Comparative Example 3 | 7.4 | 30 | Almost 10 | Almost 0 | 1000 |

As is apparent from Table 1, pore diameters of various zeolites in Examples 1 to 4 fall within a range of not less than 4.5 angstroms and not more than 7.3 angstroms. In the various zeolites, the amounts of adsorbed xenon are larger and residual xenon partial pressures are lower than Comparative Examples 1 to 3. Accordingly, zeolites in Examples 1 to 4 are adsorbents suitable for xenon adsorption. Further, among the zeolites in Examples 1 to 4, the zeolite with a pore diameter of 5.5 angstroms in Example 4 is found that it has the lowest residual xenon partial pressures compared with the zeolites in Examples 1 to 3, and it is excellent as an adsorbent.

In Comparative Example 1, a large difference in residual xenon partial pressures is found in comparison with the result of the zeolite in Example 1, which has about the same pore diameter. The reason for this is likely that a pore diameter of the Na—X zeolite with a pore diameter of 7.4 angstroms is much larger than a van der Waals' radius of xenon and therefore an interactive force with a xenon molecule is smaller than that of the limited zeolite of the present invention. As a result of this, a residual xenon partial pressure is relatively large, and this zeolite is unsuitable for application to the present invention. In addition, a Li—X zeolite, an Ag—X zeolite and a Ca—X zeolite, respectively having the same pore diameter of 7.4 angstroms, are also evaluated, resulting in the approximately same result.

In Comparative Example 2, a large difference in residual xenon partial pressures is found in comparison with the result of the zeolite in Example 1, which has about the same pore diameter. The reason for this is likely that a pore diameter of the zeolite is smaller than a van der Waals' radius of xenon and is not suitable for adsorption of a xenon molecule. As a result of this, a residual xenon partial pressure is large, and an A zeolite is unsuitable for application to the present invention even though the A zeolite is applied as a xenon adsorbent in PTL 3 and PTL 4.

In Comparative Example 3, a large difference in residual xenon partial pressure is found in comparison with the result of the zeolite in Example 1, which has about the same pore diameter. The reason for this is likely that a pore diameter of the Y zeolite with a pore diameter of 7.4 angstroms is much larger than a van der Waals' radius of xenon and therefore an interactive force with a xenon molecule is smaller than that of the limited zeolite of the present invention. As a result of this, a residual xenon partial pressure is relatively large, and this zeolite is unsuitable for application to the present invention.

Example 5

Moreover, in Example 5, a zeolite obtained by copper ion-exchanging a MFI commercialized product which is a MFI zeolite with a pore diameter of 5.5 angstroms is used in xenon adsorbing device 31 as adsorbent 3 and evaluated.

Herein, preparation of the copper ion-exchanged MFI zeolite with a pore diameter of 5.5 angstroms, used in Example 5, will be described.

The copper ion-exchanged MFI zeolite is prepared by copper ion-exchanging a commercially available MFI zeolite, and then being subjected to the steps of washing with water, drying and heat treating. First, the copper ion exchange can be carried out by a known method. A method, in which zeolite is immersed in an aqueous solution of a soluble salt of copper such as an aqueous solution of copper chloride, an aqueous solution of a salt containing an amine acid cupric complex ion or the like, is commonly employed. Among these methods, a copper ion-exchanged MFI zeolite, prepared by a method of using a $Cu^{2+}$ solution containing carboxylato such as copper (II) propionate, copper (II) acetate or the like, has a high chemical adsorption activity. Next, the copper ion-exchanged MFI zeolite is adequately washed with water. Thereafter, the washed zeolite is heated to dry or dried under a reduced pressure to remove water adhering to a surface. Moreover, the copper ion-exchanged MFI zeolite is subjected to appropriate heat treatment under low pressures. This treatment is carried out for reducing $Cu^{2+}$ introduced by ion exchange to $Cu^+$ to develop a chemical adsorption capacity. A pressure in heat treatment is 10 mPa or less, and preferably 1 mPa or less. A temperature in heat treatment is 300° C. or more, and preferably about 500° C. to 600° C. in order to promote the reduction to $Cu^+$.

By undergoing the above-mentioned steps, the copper ion-exchanged MFI zeolite provided with adsorption activity of xenon under a reduced pressure is enclosed in xenon adsorbing device 31 to bring xenon into contact with adsorbent 3 by opening opening-closing part 7. The reason for this is that if the copper ion-exchanged MFI zeolite is handled in the atmosphere, it adsorbs atmospheric components and is deactivated. Accordingly, it is preferred that the copper ion-exchanged MFI zeolite is enclosed in xenon adsorbing device 31 to bring xenon into contact with adsorbent 3 by opening opening-closing part 7 without directly contacting with air after activating by heat treatment.

An amount of adsorbed xenon of a zeolite obtained by copper ion-exchanging a MFI commercialized product which is a MFI zeolite with a pore diameter of 5.5 angstroms is 55 cc/g under atmospheric pressures, 35 cc/g at a xenon partial pressure of 30000 Pa, and 3 cc/g at a pressure of 10 Pa. A residual xenon partial pressure is 0.005 Pa.

The results of evaluations are shown in Table 2.

TABLE 2

|  | Pore diameter of zeolite (angstrom) | Amount of adsorbed xenon under atmospheric pressure (cc/g) | Amount of adsorbed xenon at a xenon partial pressure of 30000 Pa (cc/g) | Amount of adsorbed xenon at a pressure of 10 Pa (cc/g) | Residual xenon partial pressure (Pa) |
| --- | --- | --- | --- | --- | --- |
| Example 4 | 5.5 | 55 | 35 | 0.1 | 3 |
| Example 5 | 5.5 (Cu ion-exchanged) | 55 | 30 | 3 | 0.005 |

As is apparent from Table 2, a pore diameter of the MFI zeolite with a pore diameter of 5.5 angstroms falls within a range of not less than 4.5 angstroms and not more than 7.3 angstroms, and a residual xenon partial pressure is lower than Example 4. Accordingly, the MFI zeolite with a pore diameter of 5.5 angstroms is a more suitable adsorbent for adsorption of xenon enclosed in xenon enclosure space 5.

As described above, when the zeolites in Examples 1 to 5 are used for an adsorbent, xenon can be efficiently recovered under ordinary temperatures and pressures or under ordinary temperatures and low xenon partial pressures without releasing xenon to the atmosphere even though special facilities for pressurization or cooling of equipment are not introduced into a xenon recovery process. Further, it is possible to provide a gas recovery method in which workers in equipment disassembly/separation do not inhale xenon.

INDUSTRIAL APPLICABILITY

In accordance with the present invention, there is provided a xenon recovery method of high safety by which xenon can be recovered directly from the xenon-containing equipment such as a plasma TV set or the like with efficiency under ordinary temperatures and pressures or under ordinary temperatures and low xenon partial pressures. This method is industrially useful.

REFERENCE MARKS IN THE DRAWINGS

1, 21, 31 xenon adsorbing device
2 container
2A cartridge
2B cartridge
3 adsorbent
4 joint part
5 xenon enclosure space
6 xenon-containing equipment
7 opening-closing part
8 discharge part
9 vacuum pump
10 pressure gauge
11 xenon refining part

The invention claimed is:

1. A xenon adsorbing device comprising:
an adsorbent including a zeolite having a pore diameter in a range from 4.5 angstroms to 7.3 angstroms as a principal component,
wherein the adsorbent adsorbs xenon under an ordinary temperature and ordinary pressure or under an ordinary temperature and low xenon partial pressure;
a container made of a low gas-permeable material, which houses the adsorbent;
a xenon enclosure chamber, which is structured to house equipment containing xenon;
a vacuum pump, which removes air from the xenon enclosure chamber;
a joint part that joins the container to the xenon enclosure chamber and provides a path through which the xenon enclosure chamber communicates with the container housing the adsorbent;
an opening-closing part that opens or closes communication between the container and the xenon enclosure chamber;
a xenon refining part; and
a discharge part that connects the container and the xenon refining part.

2. The xenon adsorbing device according to claim 1, wherein the container comprises glass predominantly comprising silicate,
the opening-closing part comprises a low melting point glass, and a melting point of the low melting point glass is lower than a melting point of the glass in the container.

* * * * *